Figure 1:
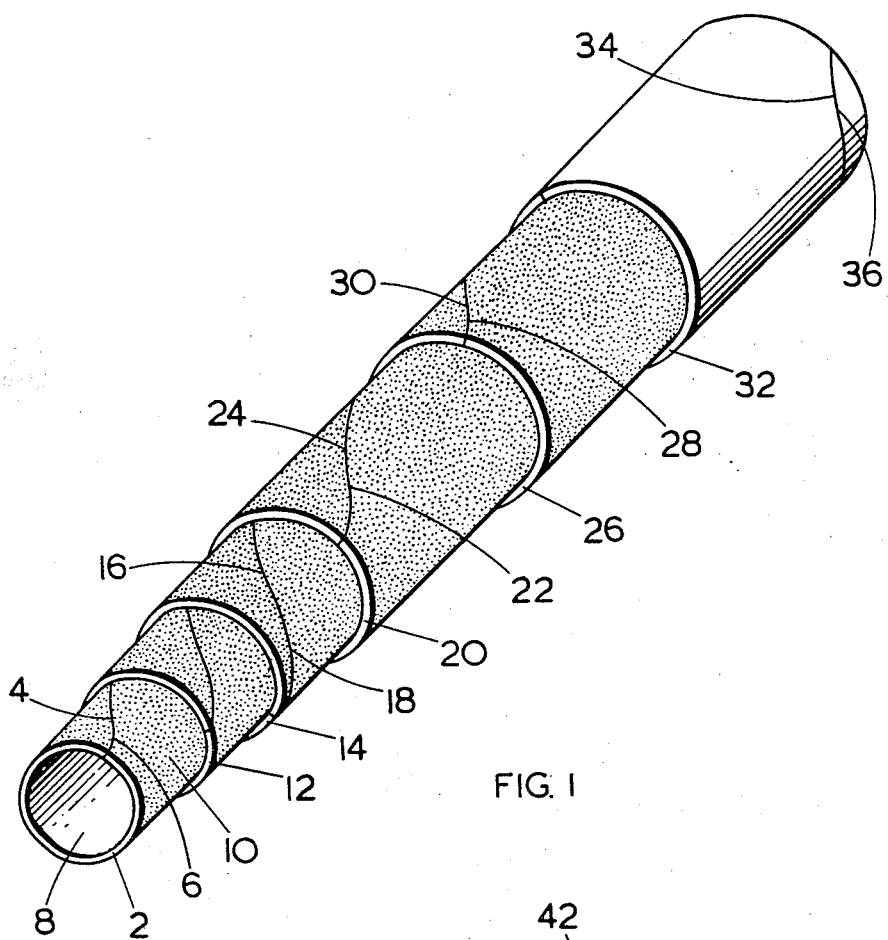

July 17, 1962 C. BAYLY ET AL 3,044,256
ROCKET MOTOR CASINGS
Filed Dec. 16, 1955

INVENTORS
CHARLES BAYLY
BERNARD OWEN WALKLEY

BY Cushman, Darby & Cushman
ATTORNEYS

3,044,256
ROCKET MOTOR CASINGS
Charles Bayly, Cleobury Mortimer, near Kidderminster, and Bernard Owen Walkley, Kidderminster, England, assignors to Imperial Chemical Industries Limited, London, England, a corporation of Great Britain
Filed Dec. 16, 1955, Ser. No. 553,459
Claims priority, application Great Britain Dec. 22, 1954
4 Claims. (Cl. 60—35.6)

This invention is concerned with rocket motor casings which must withstand very high internal pressures during use, and which are generally tubular in appearance.

It is well-known to form metal tubes by rolling a sheet of metal around a cylindrical collapsible mandrel, welding the sheet at either its abutting or its overlapping edge portions, as the case may be, and then removing the mandrel. It is desirable to construct tubular rocket motor casings having relatively low wall thicknesses, the required wall thickness in a particular case depending inter alia upon pressure considerations but being usually up to about 90 thousandths of an inch. For this purpose such casings are made from materials having a high strength/weight ratio, metals of high tensile strength being normally employed, for example, aluminum alloys or heat treated steel alloys.

The known method of forming metal tubes mentioned above is not suitable for the production of high strength rocket motor casings. When an aluminium alloy or a heat treated steel alloy which is capable of being welded is employed, not only is there likely to be a marked decrease in the strength of the metal in the region of the welded seam but also distortion of the thin walls due to heat.

It is an object of this invention to provide a rocket motor casing having a relatively low wall thickness and a high strength/weight ratio.

According to this invention a rocket motor casing comprises a plurality of layers of helically-wound strip metal, preferably a heat treated steel, adjacent windings of strip in each layer abutting at their edges, the abutting edges of the metal in at least one layer being so displaced with reference to the abutting edges of the metal in the preceding layer as to ensure no right-line path from the inside to the outside of the tube between the said abutting edges and the whole being bonded together by bonding material separating each layer from the next, a layer of hydraulically sealing material in contact with the inner surface of the innermost layer of the said plurality, and a layer of heat-insulating material in contact with the inner surface of the said sealing material.

The bonding material employed for bonding together successive layers of the wound strip is a resinous adhesive material, an epoxy resin, e.g. a condensation product of epichlorhydrin and bis-phenol, being particularly suitable.

The hydraulically sealing material may be neoprene or the material known commercially as "Bekalide" or other rubbery material having the required properties. The heat insulating material may be a filled neoprene, for example, the sheet material sold by Precision Rubber Company Limited under the formulation X177E or the spray compound sold by this company under the formulation X190W.

The casing is provided with end closures, conveniently bonded to the outermost layer of strip at the ends of the casing. Preferably, the part of the end closure bonded at the end of the casing to the outermost layer of strip metal tapers to a thin section in a direction along the casing away from the said end thereof. Conveniently the end closure is formed from an end ring bonded to the outermost layer of strip and an end cap secured to the end ring. The end ring is advantageously bonded to the strip by means of a filled epoxy resin.

Figure 2:
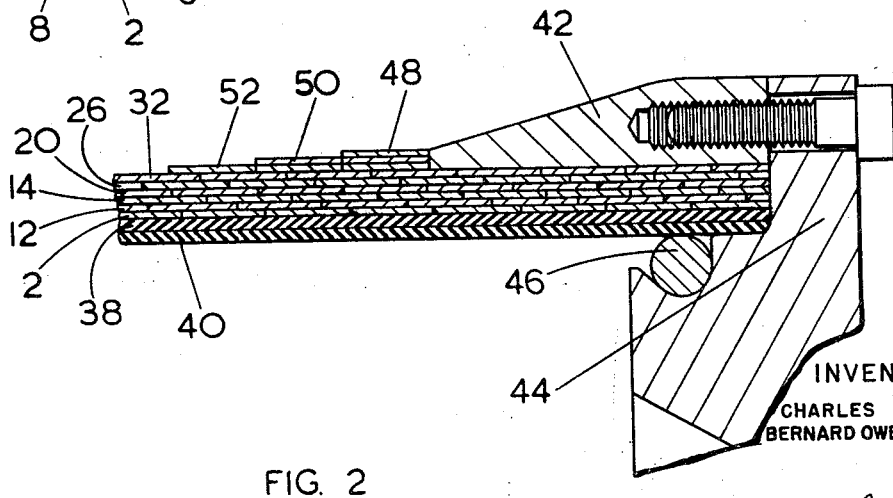

A rocket motor casing in accordance with one embodiment of the invention will now be described with reference to the accompanying drawings of which:

FIGURE 1 is a perspective view, partially broken away of the tubular part of the casing, sections of strip in successive layers being cut away to illustrate the staggering of the joints, and FIGURE 2 is an elevational sectional view of one end portion of the casing.

Referring to FIGURE 1 of the drawings a layer of strip metal 2 is helically wound with the edges 4 and 6 abutting about a collapsible or tapered mandrel 8. The metal has a coating of "Araldite" (Registered trademark) resin 10, which is a condensation product of a dihydric phenol, specifically bisphenol A, with epichlorohydrin. Superimposed on the resin coating 10 and completely covering the strip 2 is another strip of metal 12 which has the same helix angle as the first layer of strip metal but is displaced from the strip forming the first layer so that the abutting edges 4 and 6 are completely covered by metal. A third layer of strip metal 14 having abutting edges 16 and 18 displaced from those of the first layer and those of the second layer, and being wound in the same sense and with the same helix angle as the first and second layers is wound upon the second layer.

A fourth layer 20 having abutting edges 22 and 24, a fifth layer 26 having abutting edges 28 and 30 and a sixth layer 32 having abutting edges 34 and 36 are added to the previous layers. These layers are wound in the same sense, and with the same helix angle as the previous layers, and the abutting edges of the layers are displaced from each other.

Each layer of metal is provided with a coating of "Araldite" resin.

The mandrel is removed from the tube thus formed when the resin has set.

Referring to FIGURE 2, a layer of a rubber 38 suitable for providing a hydraulic seal is secured to the inside surface of the tube and a further layer of a rubber 40, having heat insulating properties, is secured to the layer 38.

In order to complete the casing, an end closure formed from an end ring 42 and an end cap 44 is secured to each portion of the outermost surface only of the tube. In order to cater for the difference in yield strength between the material of the tube and the material of the end ring, the end ring tapers to a thin section in a direction along the casing away from the end thereof.

The end ring is secured to the outer surface of the tube by means of an epoxy resin loaded with a colloidal form of lead chromate. The lead chromate enables an X-ray examination readily to be made to ascertain whether any voids are present (which voids would lead to inefficient operation of the casing) and also enables increased adhesion to be obtained.

When this resin has set, the end cap 44 with a gasket 46 can be bolted to the end ring to close the casing.

In order to lessen any bulging of the casing in the region of the inner end of the end ring during the pressure testing or firing of a charge within the casing, the outer surface is provided with several adjacent sets of layers of strip material, the number of layers decreasing by one as they approach the central portion of the casing. In FIGURE 2 three sets of layers 48, 50, and 52 are provided.

We claim:

1. A rocket motor casing for receiving a propellant charge comprising a plurality of layers of helically wound strip metal, adjacent windings of strip in each layer abutting at their edges, the abutting edges of the metal in at least one layer being so displaced with reference to the abutting edges of the metal in the preceding layer as to ensure no right line path from the inside to the outside of the tube between the said abutting edges, and the whole being bonded together by an epoxy resin separating each layer from the next, and layer means on the inner surface of the innermost layer of the said plurality for hydraulically sealing and heat-insulating the same, an end closure secured to the outermost layer of said plurality of layers, said end closure comprising an end ring bonded to the outermost layer of strip metal and an end cap secured to said end ring.

2. A rocket motor casing according to claim 1, wherein the resin is a condensation product of bisphenol A and epichlorohydrin.

3. A rocket motor casing according to claim 1 including reinforcing layers of strip surrounding the casing in the vicinity of the end closure to reduce bulging of the casing upon the build up of pressure therein.

4. A rocket motor casing according to claim 1 wherein said layer means comprises a layer of hydraulically sealing material in contact with the inner surface of the innermost layer of said plurality and a layer of heat-insulating material in contact with the inner surface of said sealing material.

References Cited in the file of this patent

UNITED STATES PATENTS

| | | |
|---|---|---|
| 285,576 | Coas | Sept. 25, 1883 |
| 534,564 | Macpherson | Feb. 19, 1895 |
| 2,706,382 | Logan et al. | Apr. 19, 1955 |
| 2,817,484 | Stenzel | Dec. 24, 1957 |

OTHER REFERENCES

Modern Plastics Encyclopedia (1953), pages 89 and 90.